US00RE40613E

(19) United States
(12) Reissued Patent
Jordan

(10) Patent Number: US RE40,613 E
(45) Date of Reissued Patent: Jan. 6, 2009

(54) PERSONAL ASSISTANT GARMENT

(75) Inventor: Scott E. Jordan, Ketchum, ID (US)

(73) Assignee: Scottevest Inc., Ketchum, ID (US)

(21) Appl. No.: 11/091,007

(22) PCT Filed: Jun. 5, 2001

(86) PCT No.: PCT/US01/18087

§ 371 (c)(1),
(2), (4) Date: Apr. 25, 2002

(87) PCT Pub. No.: WO02/080714

PCT Pub. Date: Oct. 17, 2002

Related U.S. Patent Documents

Reissue of:
(64) Patent No.: 6,826,782
Issued: Dec. 7, 2004
Appl. No.: 10/111,618
Filed: Apr. 25, 2002

U.S. Applications:
(60) Provisional application No. 60/281,877, filed on Apr. 5, 2001.

(51) Int. Cl.
*A41D 3/02* (2006.01)

(52) U.S. Cl. ..... 2/94
(58) Field of Classification Search ..... 2/94, 2/102, 247–253, 108, 85, 97, 69, 93; 381/301, 381/333, 388
See application file for complete search history.

(56) References Cited

U.S. PATENT DOCUMENTS

| | | | | | |
|---|---|---|---|---|---|
| 4,539,700 | A | * | 9/1985 | Sato | 381/333 |
| 4,589,134 | A | * | 5/1986 | Waldron | 381/301 |
| 4,825,471 | A | * | 5/1989 | Jennings | |
| 4,876,724 | A | * | 10/1989 | Suzuki | 381/385 |
| 5,361,412 | A | * | 11/1994 | Perry | |
| 5,509,147 | A | * | 4/1996 | Busquets | |
| 5,893,991 | A | * | 4/1999 | Newell | 219/211 |

* cited by examiner

*Primary Examiner*—Tejash Patel
(74) *Attorney, Agent, or Firm*—Boyle Fredrickson, SC

(57) ABSTRACT

The present invention relates to clothing and more particularly to a garment designed to hold portable electronic device and other items such as wallets, keys, etc. The garment has at least one and preferably more than one pocket to hold an electronic device, i.e., cell phone. Each pocket includes an internal passageway that leads to an interior side of the vest. The garment also includes a central passageway system which includes two passageways that are on opposite sides of the central opening of the garment. The passageways are segmented and allow for the installation of wires. The garment further includes a horizontal passageway that passes from the left side of the interior of the vest around the central portion of the back to the right side of the vest. The central passageway system, one or more wires can be removed and installed from an individual passageway segment without disturbing other wires neatly fastened in other passageway segments.

31 Claims, 5 Drawing Sheets

PERSONAL ASSISTANT GARMENT

Matter enclosed in heavy brackets [ ] appears in the original patent but forms no part of this reissue specification; matter printed in italics indicates the additions made by reissue.

*Application Ser. No. 11/091,007 is a reissue of U.S. Pat. No. 6.826,782.*This application claims priority from provisional application No. 60/281,877 filed on Apr. 5, 2001.

The present invention relates to clothing and more particularly to a garment designed to hold portable electronic devices, such as cell phones, pagers, PDAs, and other items such as wallets, keys, glasses, and allowing use of the devices without removing them from the garment by incorporating conduits and passageways therein to interconnect the devices.

BACKGROUND OF THE INVENTION

Recently, the use of portable electronic devices has increased dramatically. These devices include, but are not necessarily limited to, cellular/digital phones and/or other similar wireless communication devices such as pagers, personal digital assistants (commonly referred to as PDAs, Palm Pilots7 and/or Pocket-PCs), microcomputers, eBook readers, MP3 players, recording devices, Walkman7 and other similar portable listening devices, portable television sets, portable internal devices, radar detectors, pedometers, remote control units, portable global positioning satellite (GPS) devices, two-way radios, cameras and video recorders/camcorders (including digital cameras and video recorders/camcorders), calculators, and/or miniature flashlights. Moreover, there are a multitude of accessories related to such portable electronic devices, e.g., modems, portable printers, portable keyboards, memory cards/discs and related devices, portable scanners, batteries and other energy sources including charging and AC adapters, cradles, cables, modules, earphones/headphones/headsets and other listening devices, microphones, recording devices, software, stylus, among others. This change has corresponded with a change in the dress code. No longer are business suits the uniform of choice. Now people dress much more casually, often wearing slacks or a skirt, as applicable, and a shirt. Moreover, due to health and safety concerns, among other things, people are now using hands-free listening and talking devices at an increasing rate.

Many business activities now require individuals to carry and to use efficiently a large assortment of equipment and supplies, i.e. the devices listed above. Currently, such articles are carried in various bags, pockets, cartons and cases. As a result of relatively unorganized carriage of this equipment and supplies, their use consumes excessive time and energy. Additionally, recharging of the batteries and care of equipment when not in use also consumes a large portion of time that could be decreased with an effective tool for handling and using such items.

Usually, vest or like articles must be particularly sized for an individual user, especially if there are any internal interconnected parts. To date, however, no garment exists designed specifically to allow a person to use existing portable electronic devices without the incorporation of any hardware that may be required for the connection to other devices while wearing the garment at the same time as also being fashionable and versatile enough to wear in the average workplace setting, such as an office. Additionally, none provide for carriage of numerous devices in ways that can be used efficiently with minimal stress on the lower back of a wearer's body, and that may be adjustably fitted for multiple users while still remaining functionally interconnected. The present invention addresses these concerns.

SUMMARY OF THE INVENTION

The present invention is particularly directed to a garment that supports and interconnects portable electronic devices. Although initially designed as a vest, portions of the garment in the present invention, most notably the passageways and pockets, also can be fabricated into a shirt, coat or jacket. The vest includes two exterior breast pockets, two hidden breast pockets, four exterior abdomen pockets and four interior abdomen pockets that are provided with internal openings to allow the passage of connections from back to back pockets. The vest also includes closable passageways that allows for the interconnectivity between the breast and abdomen pockets and the right and left side of the vest. The passageways also connect the neck area of the garment to the pockets to allow for the attachment of listening and microphone devices.

Other features of the invention will become apparent from the drawings and the detailed description of the invention is to provide for a garment that can allow for a plurality of wires to be routed from one pocket to another and to the neck area of the garment to allow for the interconnection of portable electronic devices and to keep the wires organized and hidden out of site.

A further object of the invention is to provide a computer housing of cloth material that may be worn by the user without restricting the user's body movement and the ability to use such equipment while wearing the garment. My garment can provide an ergonometric housing for a digital computer or for other electronic equipment that one may with to carry about while allowing the user relatively unrestrained body movement.

Further, in some aspects, the garment can be provided with compartmentalized pockets to retain beverages and prevent contact between electronic devices, and can also be structured to fit a wide range of individuals by an adjusting waist structure. My garment can enable ordered and continued interconnection of internal features despite the adjusted size, thereby enabling multiple users to wear the same vest.

DETAILED DESCRIPTION OF THE INVENTION

Figure 1:
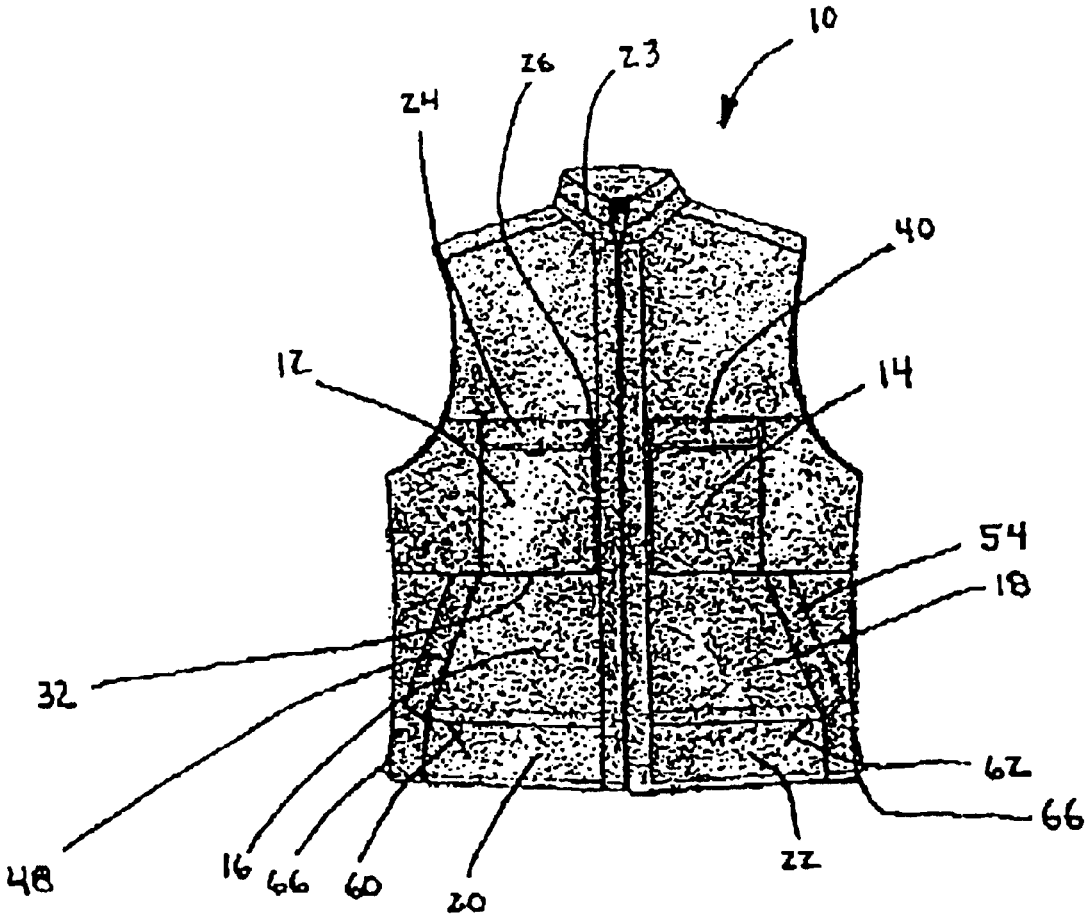
FIG. 1 is an elevational view showing the front exterior side of the vest of the present invention.

For the purpose of promoting an understanding of the principles of the invention, references will be made to the embodiment illustrated in the drawings. Specific language will also be used to describe the same. It will, nevertheless, be understood that no limitation of the scope of the invention is thereby intended, such alterations and further modifications in the illustrated device, and such further applications of the principles of the invention illustrated herein being contemplated as would normally occur to one skilled in the art to which the invention relates.

One of the features of some of our proposed garments is that they can be freed of all electronic components and hardware so that it can be laundered in an ordinary fashion.

Another feature is that my garment allows a plurality of wires to be routed from one pocket to another and to the neck area of the garment to allow for the interconnection of portable electronic devices and to keep the wires organized and hidden out of site.

A still further feature is providing a garment that may be worn by the user without restricting the user's body movement and the ability to use such equipment while wearing the garment. My garment can provide an ergonometric housing for a digital computer or for other electronic equipment that one may wish to carry about while allowing the user relatively unrestrained body movement.

A preferred embodiment of a portable electronics vest 10 of the present invention is shown in FIG. 1 with the vest in the closed position, which is accomplished by using a zipper or other fastener known to those skilled in the art. The vest 10 can be fabricated out of a variety of materials but preferably it is fabricated out of nylon, cotton, polyester microfiber or a polyester wool blend. The vest 10 which has one or more pockets is shown with six visible exterior pockets, a right breast pocket 12, a left breast pocket 14, a right abdomen zipper pocket 16, a left abdomen zipper pocket 18, a right privacy zipper pocket 20, a left privacy zipper pocket 22 and a raised privacy collar 23.

Figure 2:
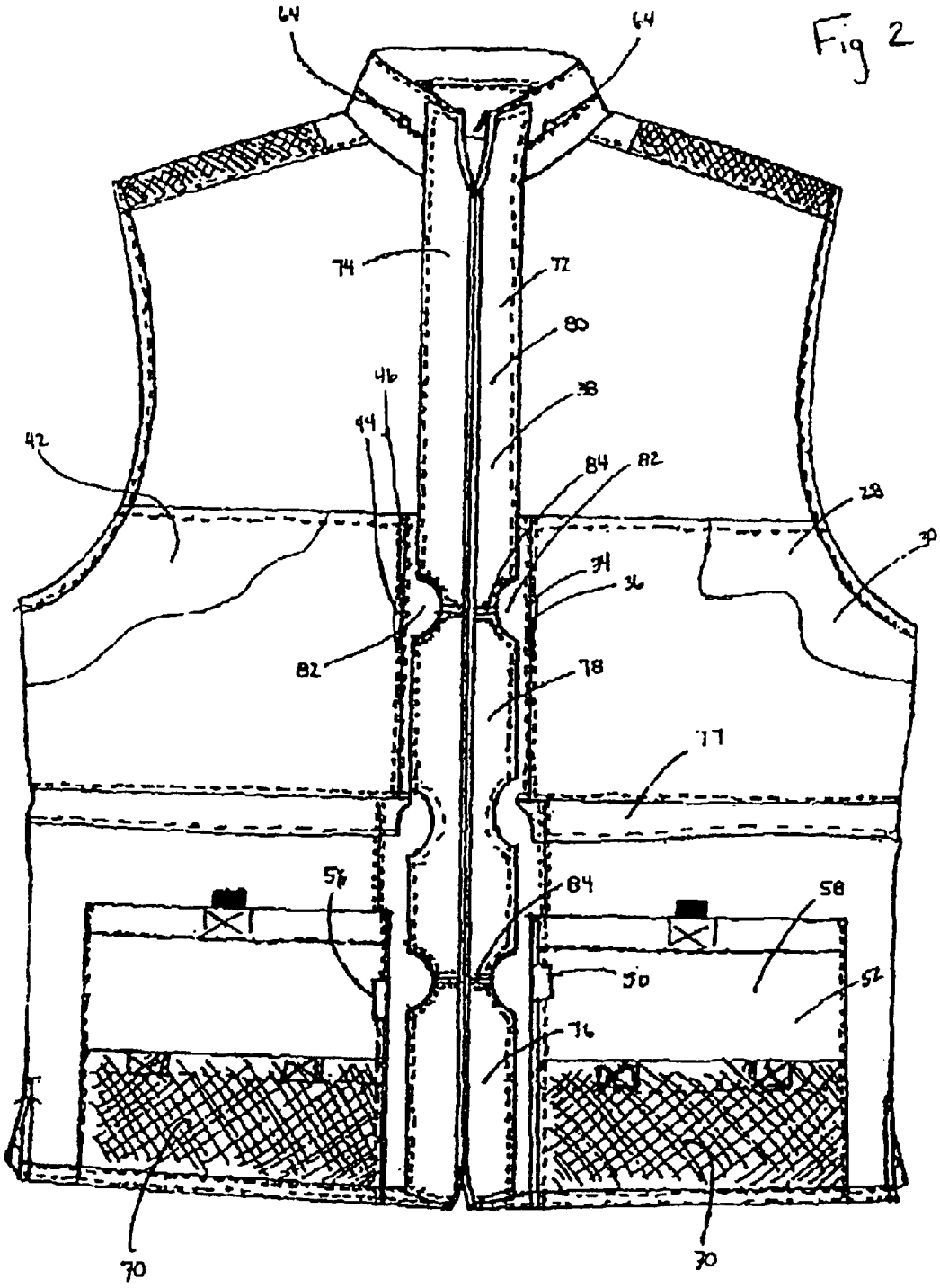
FIG. 2 is an elevational view showing the front interior side of the vest.
Figure 3:
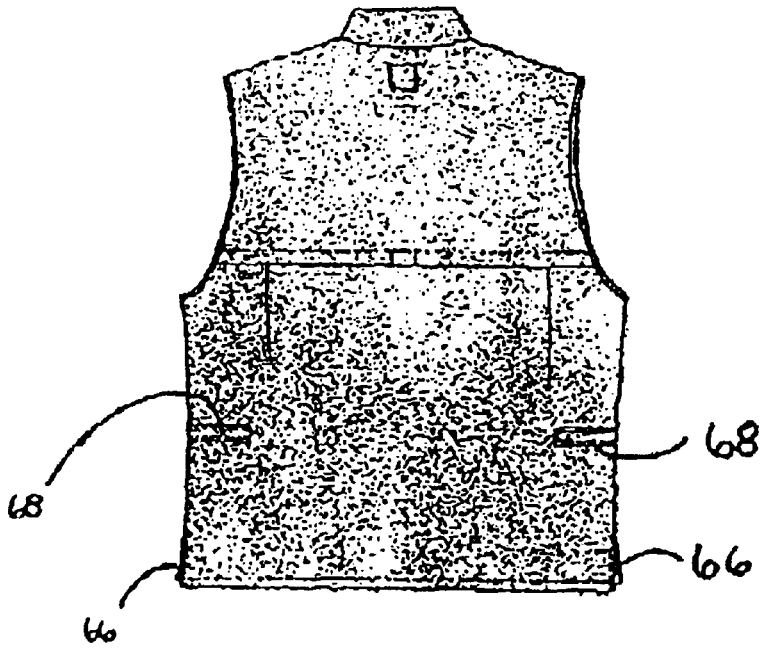
FIG. 3 is an elevational view showing the rear exterior side of the vest.
Figure 5:
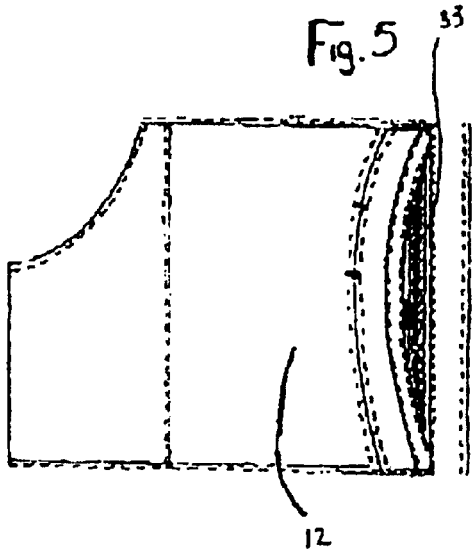
FIG. 5 is an elevational view showing the right breast pocket.
Figure 6:
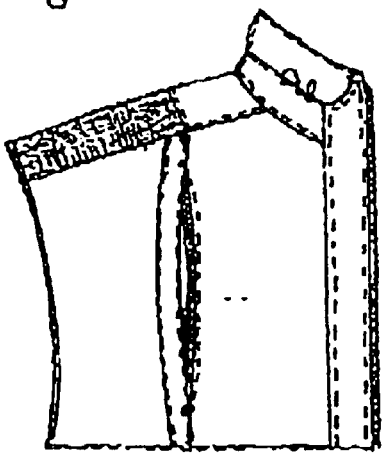
FIG. 6 is an elevational view showing a right hidden shoulder pocket.
Figure 7:
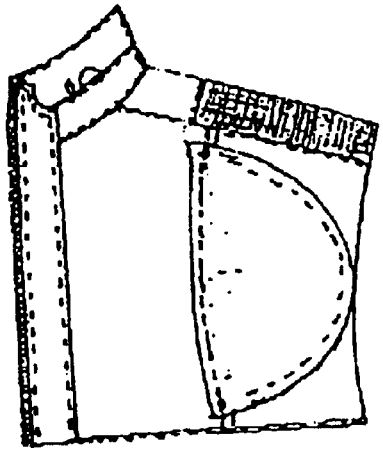
FIG. 7 is an elevational view showing a left hidden shoulder pocket on the interior side of the vest.
Figure 8:
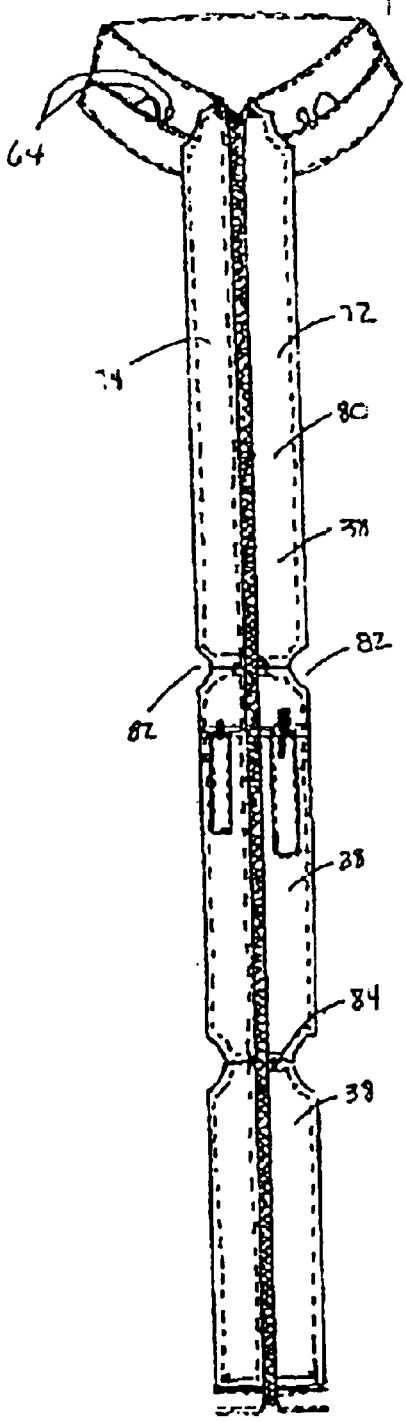
FIG. 8 is an elevational view showing the central passageway system.

The right breast pocket 12 is rectangular in shape and includes a top flap 24 that allows access to the opening 26 of the pocket. The flap 24 of the right breast pocket 12 is held closed by the use of Velcro®, a loop type fastener or a snap, but other types of fasteners can be used known to those skilled in the art, such as a zipper or buttons. The flap 24 can be opened to allow for the ingress and egress of personal electronic devices such as cellular/digital phones and/or other similar wireless communication devices such as pagers, personal digital assistants (commonly referred to as PDAs, Palm Pilots7 and/or Pocket PCs), microcomputers, eBook readers, MP3 players, recording devices, Walkman7 and other similar portable listening devices, portable television sets, portable internet devices, radar detectors, pedometers, remote control units, portable global positioning satellite (GPS) devices, two-way radios, cameras and video recorders/camcorders (including digital cameras and video recorders/camcorders), calculators, and/or miniature flashlights. Within the right breast pocket 12 is a dividing flap 28, as shown in FIG. 2, which creates a hidden pocket 30. The hidden pocket 30 allows for the placement of two electronic devices in one pocket without physical contact that may cause damage. The right breast pocket 12 has a bellow 32, shown in FIG. 1, located around the periphery of the pocket to allow expansion in an accordion type fashion, which accommodates their electronic devices. The hidden pocket 30 can be accessed through the side of the pocket through opening 33, as shown in FIG. 5, on the inside of the vest. The opening 33 is held in the closed position by a Velcro7 fastener. Both the hidden pocket 30 and the breast pocket 12 include passageways 34 and 36 that allow for the passage and routing of electrical wires and connectors. The passageways 34 and 36 allow an electronic device in the right breast pocket 12 to be connected to an electronic device in the hidden pocket 30 or for the wiring from the pockets to enter the central passageway system 38.

The left breast pocket 14 also includes a flap 40 and a hidden pocket 42 and operates in the same fashion as the right breast pocket 12. The left breast pocket 14 also includes passageways 44 and 46, which allow for the connection of electrical devices from the left breast pocket 14 to the hidden pocket 42 or allows the wiring from the pockets to enter the central passageway system 38.

The right abdomen pockets 16, as shown in FIG. 1, is accessible through a sideways oriented flap 48 that held closed by the use of a zipper, Velcro®, loop type fastener of a snap, but other types of fasteners can be used known to those skilled in the art, such as buttons. The right abdomen pocket 16 is dimensionally a larger pocket than the breast pockets 12 and 14 and is designed to accommodate larger electronic devices. The right abdomen pocket 16 shares a passageway 50, shown in FIG. 2, with a right interior abdomen pocket 52 to allow interconnectivity of the two pockets and allows the wiring from the pockets to enter the central passageway system 38. Inside the right abdomen pocket 16, the inner lining (not shown) extends upwardly, behind and beyond the right breast pocket 12 to the collar, which allows devices with shorter wire leads to bypass the central passageway system 38, enabling the wiring to be directly connected to the right breast pocket 12.

The left abdomen pocket 18, as shown in FIG. 1, also is accessible through a sideways oriented flap 54 and operates in the same fashion as the right abdomen pocket 16. The left abdomen pocket 18 also includes passageway 56, shown in FIG. 2, which allows for the connection of electrical devices from the left breast pocket 18 to a left abdomen interior pocket 58, shown in FIG. 2, or allows the wiring from the pockets to enter the central passageway system 38. Inside the left abdomen pocket 18, the inner lining (not shown) extends upwardly, behind, and beyond the left breast pocket 14 to the collar which allows devices with shorter wire leads to bypass the central passageway system 38, enabling the wiring to be directly connected to the left breast pocket 14. The wiring can be inserted from the pockets 16 and 18 through the lining of the vest instead of through the central passageway system 38.

The right privacy zipper pocket 20 and left privacy zipper pocket 22 are located below the right and left abdomen pockets 16 and 18 and are provided with zippers 60 and 62 to seal off the pockets to prevent the accidental loss of batteries, monies or keys.

The raised privacy collar 23, as shown in FIG. 1, is connected to the central passageway system 38 and is designed to accommodate a microphone, headset and/or earbuds that can be attached to one of the microphone, headset, and/or earbuds clips 64, shown in FIG. 2, located on the inside of the collar 23. The clips 64 are shown as elastic loops but other types of retaining devices can also be used such as clips, tabs or buttons or others known to those skilled in the art. The collar 23 conceals the microphone to protect it from the weather elements and reduce the amount of wind noise interference. The clips 64 can also be used to route a pair of earphones so that the user of the vest can conduct private phone conversations and/or listen to music. The sides of the vest 10 include slits 66, shown in FIG. 1, and adjustment tabs 68 that allow for a more uniform fit of the vest 10 to adjust to the individual user. These adjustments allow for the broadening or narrowing of the abdominal region and the bottom portion of the vest 10 to flair to overlap the pants of the user.

The pockets also include dividers (not shown) which have a vertical oriented strip of Velcro7 connected or the inside walls of the pocket and are used to hold beverages and prevent contact between electronic devices. The Velcro7 strip, when closed compartmentalizes the pockets by adjoining the inner and outer walls of the pocket, which prevent beverages from tipping over and shifting around.

Figure 4:
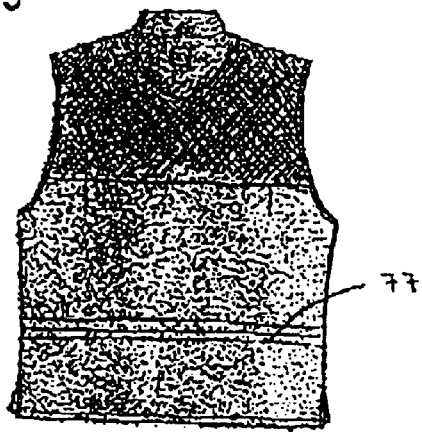
FIG. 4 is an elevational view showing the rear interior side of the vest.
Figure 9:
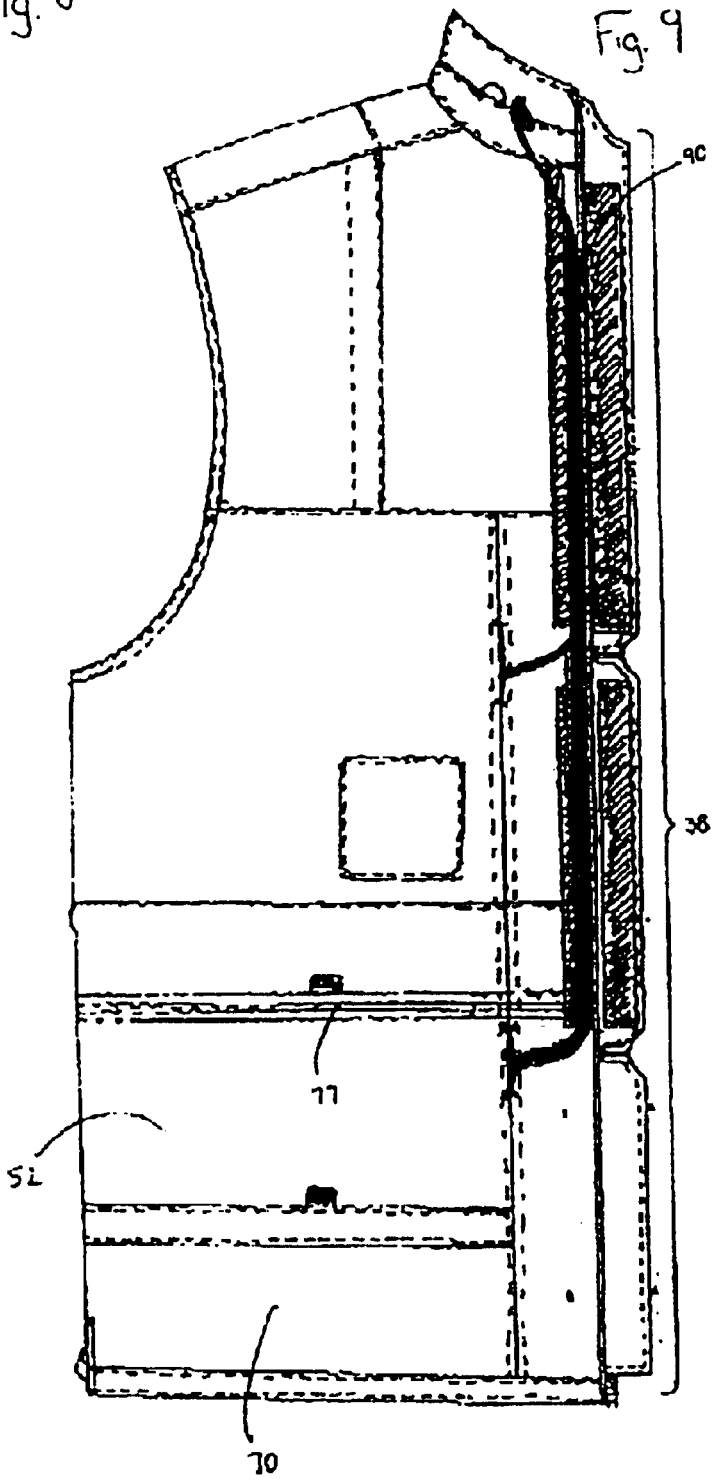
FIG. 9 is an elevational view of the right half of the vest with part of the central passageway in the open position to accept wires from the pockets.

The inside of the vest 10, shown in FIG. 2, includes two mesh pockets 70 located on either side of the central opening of the vest to accommodate spare batteries, extra wiring, disks, adapters and the like. The inside of the vest 10 includes the central passageway system 38 or Personal Area Network (P.A.N.), which is comprised of two vertically extending passageways 72 and 74 and a horizontally extending passageway 77 that extends from the right side, around the back and to the left side of the garment 10. The conduits consist of a fabric flap that is fastened along a first edge 73 to the vest and releasably attached to the vest along the second edges 75. The passageways can be opened and closed easily to allow for the installation and removal of electrical wires and connectors. The conduits are held in the closed position by use of Veclro®, 90, as shown in FIG. 9, which is placed along the edge 75 of the flap, but other types of fasteners can be used by those skilled in the art, such as zippers, or a hook and loop type fastener. The vertically extending passageways 72 and 74 are divided into three segments, a lower segment 76, a middle segment 78 and a upper segment 80. The passageways 72 and 74 also include a plurality of c-shaped outlets 82 located at the segment intersections 84. The c-shaped outlets 82 allow for a large group of wires to enter the passageway and maintain them in the location of the segment intersection 84. Without the outlets 82, the wires tend to ungroup and become unorganized. The upper segment 80 allows interconnection of the collar 23 with the middle segment 78, the hidden pockets 40 and 42, and the right and left breast pockets 12 and 14. The middle segment 78 allows interconnection of the upper segment 80, the hidden pockets 40 and 42, the right and left breast pocket 12 and 14, the interior abdomen pockets 52 and 58, the exterior abdomen pockets 16 and 18, the lower segment 76 and the horizontal passageway 77. The lower segment 76 interconnects the right and left interior abdomen pockets 52 and 58, the exterior abdomen pockets 16 and 18, the middle segment 70. The horizontal passageway 77 passes from the left side of the interior of the vest around the central portion of the back, shown in FIG. 4. The horizontal passageway 77 allows wires from pockets on the right side of the vest to be routed to the left side of the vest so that there is interconnectivity between the pockets. With this arrangement, one or more wires can be removed and installed from an individual segment without disturbing other wires neatly fastened in other passageway segments. This arrangement allows wiring from a first electronic device such as a MP3 player to be removed from the garment without disturbing the wiring of other electronic devices such as cellular phones or personal digital assistants. The pockets are designed to allow various types of electronic devices to be placed within them and interconnected with any other device in any other pocket of the vest. Since the vest can be voided of all electronic hardware and wiring harnesses, the vest can be washed in a normal manner.

To interconnect two electronic devices, wherein a first electronic device, such as a cell phone, is located in the right breast pocket 12 and a second electronic device, such as a personal digital assistant (PDA) is located in the left abdomen pocket 18, the wiring for the phone is inserted into the right breast pocket 12, through passageway 34. The middle segment 78 is opened and the wiring is inserted and routed downward until the wiring is positioned at the C-shaped outlets 82. Horizontal passageway 77 is opened and the wiring is inserted and routed around the back of the garment until it arrives at the middle segment 78 on the opposite side of the central opening of the vest. The middle segment 78 is opened and the wiring is inserted and routed downward and inserted through passageway 50 into the left abdomen pocket 18. The PDA can then be inserted into the abdomen pocket 18 and connected to the wiring, interconnecting the phone with the PDA. If the user wants to connect a microphone and earbuds to the collar 23, it can be accomplished without disturbing the interconnection between the phone and the PDA. The microphone and earbuds are first attached to the collar clip 64. Upper segment 80 is opened and the wires for the microphone and earbuds are inserted and routed downward and inserted through passageway 36, allowing the wires to be connected with the phone.

Various features of the invention have been particularly shown and described in connection with the illustrated embodiment of the invention, however, it must be understood that these particular arrangements merely illustrate, and that the invention is to be given its fullest interpretation within the terms of the appended claims. The invention need not encompass all of the attributes described herein. For instance, I intend to cover:

An electronic device personal assistant garment having a plurality of electronic device holding pockets, a plurality of electronic wires, that connect said pockets, said wires being independently and readily removable from said garment to permit said garment to be cleaned or to allow said wires to be interchanged.

An electronic device garment wiring passageway system for containing wiring in a garment of clothing having at least one passageway having at least two segmented flaps fastened along a first edge of said flaps to the garment and releasably attached to said garment along a second edge, the flaps including fasteners along the second edge to secure the flaps to the garment and allowing the flaps to open for the inclusion of the wiring, the at least one passageway further including c-shaped outlets located at intersections formed by the segmented flaps adapted to group the wiring, whereby the flaps can be selectively opened and closed to allow for the placement of the wiring.

The articles specifically set forth in my independent and dependent claims which are not disclosed in the prior art.

What is claimed is:

[1. A garment comprising:

a body having a top end, a bottom end and a number of openings extending through the body, the body formed at least partially of an interior panel and an exterior panel connected to the interior panel to define an open center therebetween;

at least one pocket passageway disposed on the interior panel opposite the open center and extending between the top and bottom ends, the at least one pocket passageway including at least one flap fixedly secured at one end of the interior panel and a releasable closure disposed adjacent the flap opposite the fixed end, the closure releasably engageable with the flap; and at least one exterior pocket disposed on the exterior panel and interconnected with the open center and the at least one pocket passageway.]

[2. The garment of claim 1 wherein the at least one exterior pocket includes a releasable divider disposed inside the at least one exterior pocket and capable of selectively dividing the at least one exterior pocket into separate pocket sections.]

[3. The garment of claim 1 further comprising:

a releasable securing mechanism on the body extending from the top end to the bottom end;

a first pocket passageway disposed on the interior panel on one side of the securing mechanism; and a second pocket passageway disposed on the interior panel on the other side of the securing mechanism, wherein the first and second passageways are interconnected with the open center and the at least one exterior pocket.]

[4. The garment of claim 3 further comprising a conduit extending along the interior panel of the body between the top and bottom ends and interconnecting the first and second pocket passageways.]

[5. The garment of claim 1 further comprising a slit in the interior panel that allows the open center to be interconnected within the at least one pocket passageway.]

[6. The garment of claim 1 wherein the body includes a retaining member disposed adjacent the top end that is adapted to receive and retain one end of a wire.]

[7. The garment of claim 1 wherein the at least one exterior pocket includes a slit that allows the at least one exterior pocket to communicate with the open center and the at least one pocket passageway.]

[8. The garment of claim 1 wherein the at least one pocket passageway comprises a number of separately movable flaps.]

[9. The garment of claim 1 further comprising at least one interior pocket disposed on the interior panel and interconnected with the open center, the at least one pocket passageway and the at least one exterior pocket.]

[10. The garment of claim 9 wherein the at least one interior pocket includes a slit that allows the at least one interior pocket to be interconnected with the open center, the at least one pocket passageway and the at least one exterior pocket.]

[11. The garment of claim 9 wherein the at least one interior pocket and the at least one exterior pocket are disposed on the body directly opposite one another.]

[12. The garment of claim 1 wherein the at least one exterior pocket includes a first pouch and a second pouch separated by a partition, a first releasable fastener that allows access to the first pouch, and a second releasable fastener that allows access to the second pouch.]

[13. A method of releasably connecting an electronic device to a garment, the method comprising the steps of:

a) providing a garment having a body including a top end, a bottom end and a number of openings extending through the body, the body formed of an interior panel connected to an exterior panel to define a open center, at least one pocket passageway disposed on the interior panel opposite the open center and extending between the top and bottom ends, and a first pocket disposed on one of the panels and interconnected with the open center and the at least one pocket passageway;

b) placing the device in the first pocket;

c) extending a wire from the device from the first pocket through the open center into the at least one pocket passageway; and d) connecting the wire from the at least one pocket passageway to the garment.]

[14. The method of claim 13 wherein the first pocket is disposed on the exterior panel.]

[15. The method of claim 13 wherein the first pocket is disposed on the interior panel.]

[16. The method of claim 13 wherein the garment includes a retainer adjacent the top end and the step of connecting the wire to the garment comprises the step of inserting the wire through the retainer.]

[17. The method of claim 13 wherein the garment includes a first pocket passageway disposed on the interior panel separated from a second pocket passageway disposed on the interior panel by a securing mechanism extending between the top and bottom ends, a conduit extending between the first passageway and the second passageway along the interior panel and a second pocket disposed on one panel of the body and interconnected with the open center and the second pocket passageway, and wherein the step of connecting the wire to the garment comprises the steps of:

a) extending the wire from the first pocket passageway into the conduit;

b) extending the wire through the conduit into the second passageway, and c) inserting the wire from the second passageway into the second pocket.]

[18. The method of claim 17 wherein the second pocket is disposed on the exterior panel.]

[19. The method of claim 17 wherein the second pocket is disposed on the interior panel.]

[20. A garment comprising:

a body having a top end, a bottom end and a number of openings extending through the body, the body formed of an interior panel connected to an exterior panel to define an open center;

at least one pocket passageway disposed on the interior panel, interconnected with the open center and extending between the top and bottom ends;

at least one exterior pocket disposed on the exterior panel including an exterior slit interconnected with the open center; and at least one interior pocket disposed on the interior panel and including an interior slit interconnected with the open center.]

*21. A garment comprising:*

*a) an inner shell;*

*b) an outer shell connected to and disposed around the inner shell;*

*c) at least one pocket disposed on the inner shell or the outer shell, the at least one pocket including an opening allowing items to be inserted into and removed from the pocket; and*

*d) at least one wire routing member disposed on the garment and having a first aperture and a second aperture spaced from the first aperture, the routing member capable of receiving a wire extending from the at least one pocket through one of the first aperture or a second aperture, enclosing the wire within the wire routing member between the first aperture and the second aperture, and allowing the wire to exit the wire routing member through the other of the first aperture or the second aperture, wherein the at least one wire routing member is formed at least partially of an open center of the garment defined between the inner shell and the outer shell.*

*22. The garment of claim 21 wherein the at least one wire routing member is formed on the inner shell.*

*23. The garment of claim 21 further comprising a third aperture and a fourth aperture on the at least one wire routing member spaced from each of the first aperture and the second aperture and one another, the third aperture and the fourth aperture each capable of enabling a wire to exit or enter the at least one wire routing member.*

*24. The garment of claim 21 wherein the at least one pocket is an inner pocket disposed on the inner shell.*

*25. The garment of claim 24 wherein the inner pocket is disposed on an exterior surface of the inner shell.*

*26. The garment of claim 25 further comprising an outer pocket disposed on the outer shell, the outer pocket in communication with the at least one wire routing member.*

*27. The garment of claim 26 wherein the outer pocket is in communication with the inner pocket.*

*28. The garment of claim 27 further comprising an open center formed between the inner shell and the outer shell, wherein the inner pocket and the outer pocket are in communication with the open center.*

*29. The garment of claim 21 wherein the opening in the at least one pocket comprises one of the first aperture or the second aperture.*

*30. The garment of claim 21 wherein the at least one wire routing member is disposed on an outer surface of the inner shell.*

*31. The garment of claim 21 wherein the opening in the at least one pocket comprises one of the first aperture or the second aperture.*

*32. The garment of claim 21 further comprising a first wire routing member formed of the open center, and at least one second wire routing member disposed on the inner shell and interconnected with the first wire routing member and the at least one pocket.*

*33. The garment of claim 21 wherein the first aperture is positioned adjacent a closure for the garment, and the second aperture is positioned adjacent a collar for the garment.*

*34. The garment of claim 21 wherein the first aperture and the second aperture each include selectively openable closing means.*

*35. The garment of claim 34 wherein the closing means are formed from the group consisting of: hook and loop closures, snap closures, button closures and zipper closures.*

*36. The garment of claim 33 further comprising a wire engaging means adjacent the collar.*

*37. The garment of claim 21 further comprising a wire holder member disposed on the inner shell adjacent one of the first aperture or the second aperture.*

*38. The garment of claim 37 wherein the wire holding member is an elastic loop.*

*39. The garment of claim 37 wherein the wire holding member is a pouch.*

*40. The garment of claim 37 wherein each of the at least one exterior pocket and the at least one interior pocket includes a slit interconnecting the at least one interior pocket with the open center or the at least one pocket passageway.*

*41. A garment comprising:*

*a) an inner shell defining an inner back panel and a pair of inner front panels extending from opposed sides of the inner back panel;*

*b) an outer shell secured over the inner shell and defining an outer back panel and a pair of outer front panels extending from opposed sides of the outer back panel, the inner front panels and outer front panels defining a closure therebetween having an upper end and a lower end;*

*c) a pocket disposed on one of the inner shell or the outer shell and having an opening therein; and*

*e) a wire routing member defined by an open center formed between the inner shell and the outer shell and in communication with the opening in the pocket, the wire routing member having a first aperture disposed adjacent the upper end of the closure.*

*42. The garment of claim 41 wherein the first aperture includes a hook and loop closure.*

*43. The garment of claim 41 further comprising a second aperture on the wire routing member disposed adjacent the lower end of the closure.*

*44. The garment of claim 43 wherein the second aperture includes a hook and loop closure.*

*45. A method for concealing wires in a garment, the method comprising the steps of:*

*a) providing a garment including an inner shell, an outer shell connected to and disposed around the inner shell, a pocket disposed on the inner shell or the outer shell and including an opening extending therethrough, and a wire routing member disposed on the garment and having a first aperture and a second aperture spaced from the first aperture;*

*b) drawing a wire from the pocket into the wire routing member through the first aperture; and*

*c) drawing the wire out of the wire routing member through the second aperture, wherein the wire routing member is formed at least partially by an open center defined between the inner shell and the outer shell, and the step of drawing the wire out of the pocket into the wire routing member comprises drawing the wire into the open center of the garment.*

*46. The method of claim 45 wherein the first aperture is formed of the opening in the pocket, and the step of drawing the wire from the pocket into the wire routing member comprises drawing the wire through the opening in the pocket.*

*47. A garment comprising:*

*a) a body having a top end, a bottom end, and a number of openings extending through the body, the body formed of an interior panel connected to at exterior panel to define an open center therebetween;*

*b) at least one pocket passageway disposed on the interior panel and interconnected with the open center;*

*c) at least one exterior pocket disposed on the exterior panel and interconnected with at least one of the open center or the at least one pocket passageway; and*

*d) at least one interior pocket disposed on the interior panel and interconnected with at least one of the open center or the at least one pocket passageway.*

*48. A garment comprising:*

*a) a shell having an interior surface and an exterior surface and including at least one opening adapted to receive a portion of a wearer's body therein;*

*b) a pocket exposed at least partially on the interior surface of the shell and including an aperture allowing items to be inserted into the pocket, the pocket further including a slit spaced from the aperture and adapted to enable a wire extending from an item positioned within the pocket to pass therethrough; and*

*c) a wire holding member secured to the shell adjacent the at least one opening and adapted to hold the wire extending from the slit in the pocket.*

*49. The garment of claim 48 wherein the wire holding member is secured to the interior surface of the shell.*

*50. The garment of claim 48 wherein the wire holding member is formed as a loop of elastic material.*

*51. The garment of claim 48 wherein the wire holding member is formed as a pouch.*

* * * * *

US00RE40613C1

(12) EX PARTE REEXAMINATION CERTIFICATE (8291st)

United States Patent

Jordan

(10) Number: US RE40,613 C1

(45) Certificate Issued: Jun. 7, 2011

(54) PERSONAL ASSISTANT GARMENT

(75) Inventor: Scott E. Jordan, Ketchum, ID (US)

(73) Assignee: TEC-Technology Enabled Clothing, Inc., Ketchum, ID (US)

Reexamination Request:
No. 90/010,801, Jan. 29, 2010

Reexamination Certificate for:

| | |
|---|---|
| Patent No.: | **Re. 40,613** |
| Issued: | **Jan. 6, 2009** |
| Appl. No.: | **11/091,007** |
| Filed: | **Mar. 28, 2005** |

(22) PCT Filed: Jun. 5, 2001

(86) PCT No.: PCT/US01/18087

§ 371 (c)(1),
(2), (4) Date: Apr. 25, 2002

(87) PCT Pub. No.: WO02/080714

PCT Pub. Date: Oct. 17, 2002

Related U.S. Patent Documents

Reissue of:

(64) Patent No.: 6,826,782
Issued: Dec. 7, 2004
Appl. No.: 10/111,618
Filed: Apr. 25, 2002

Related U.S. Application Data

(60) Provisional application No. 60/281,877, filed on Apr. 5, 2001.

(51) Int. Cl.
*A41D 3/02* (2006.01)

(52) U.S. Cl. ..... 2/94

(58) Field of Classification Search ..... None
See application file for complete search history.

(56) References Cited

U.S. PATENT DOCUMENTS

| | | | |
|---|---|---|---|
| 1,900,129 | A | 3/1933 | Ring |
| 2,156,504 | A | 5/1939 | Liss |
| 4,322,585 | A | 3/1982 | Liautaud |
| 4,589,134 | A | 5/1986 | Waldron |
| 4,637,075 | A | 1/1987 | Ingrisano et al. |
| 4,876,724 | A | 10/1989 | Suzuki |
| 5,148,002 | A | 9/1992 | Kuo et al. |
| 5,211,321 | A | 5/1993 | Rodriguez |
| 5,416,310 | A | 5/1995 | Little |
| 5,555,490 | A | 9/1996 | Carroll |
| 5,572,401 | A | 11/1996 | Carroll |
| 6,097,822 | A | 8/2000 | Min |
| 6,311,335 | B1 | 11/2001 | Uchida |
| 6,324,053 | B1 | 11/2001 | Kamijo |
| 6,339,846 | B2 | 1/2002 | Uchida |
| 6,801,140 | B2 | 10/2004 | Mantyjarvi et al. |
| RE40,613 | E | 1/2009 | Jordan |
| 2007/0136924 | A1 | 6/2007 | Jordan |

FOREIGN PATENT DOCUMENTS

| | | | |
|---|---|---|---|
| GB | 2158693 | A | 11/1985 |

*Primary Examiner*—Aaron J. Lewis

(57) ABSTRACT

The present invention relates to clothing and more particularly to a garment designed to hold portable electronic device and other items such as wallets, key, etc. The garment has at least one and preferably more than one pocket to hold an electronic device, i.e., cell phone. Each pocket includes an internal passageway that leads to an interior side of the vest. The garment also includes a central passageway system which includes two passageways that are on opposite sides of the central opening of the garment. The passageways are segmented and allow for the installation of wires. The garment further includes a horizontal passageway that passes from the left side of the interior of the vest around the central portion of the back to the right side of the vest. The central passageway system, one or more wires can be removed and installed from an individual passageway segment without disturbing other wires neatly fastened in other passageway segments.

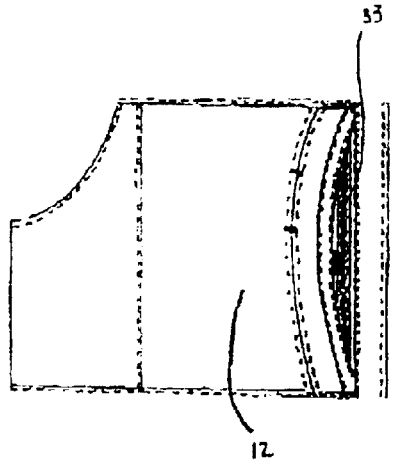

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 29, 34, 35, 42 and 44 is confirmed.

Claims 1-20 were previously cancelled.

Claims 21-28, 30, 33, 36, 41, 43, 45, 46 and 48-51 are cancelled.

Claims 31, 32 and 37 are determined to be patentable as amended.

Claims 38-40, dependent on an amended claim, are determined to be patentable.

Claim 47 was not reexamined.

31. *The garment of claim* [[*21*]] 30 *wherein the opening in the at least one pocket comprises one of the first aperture or the second aperture.*

32. [[*The garment of claim 21*]] A garment comprising:

a) an inner shell;

b) an outer shell connected to and disposed around the inner shell;

c) at least one pocket disposed on the inner shell or the outer shell, the at least one pocket including an opening allowing items to be inserted into and removed from the pocket; and d) at least one wire routing member disposed on the garment and having a first aperture and a second aperture capable of receiving a wire extending from the at least one pocket through one of the first aperture or a second aperture, enclosing the wire within the wire routing member between the first aperture and the second aperture, and allowing the wire to exit the wire routing member through the other of the first aperture or the second aperture, wherein the at least one wire routing member is formed at least partially of an open center of the garment defined between the inner shell and the outer shell;

wherein the at least one pocket is an inner pocket disposed on an exterior surface of the inner shell;

further comprising an outer pocket disposed on the outer shell, the outer pocket in communication with the at least one wire routing member and the inner pocket;

*further comprising a first wire routing member formed of the open center, and at least one second wire routing member disposed on the inner shell and interconnected with the first wire routing member and the at least one pocket.*

37. [[*The garment of claim 21*]] A garment comprising:

a) an inner shell;

b) an outer shell connected to and disposed around the inner shell;

c) at least one pocket disposed on the inner shell or the outer shell, the at least one pocket including an opening allowing items to be inserted into and removed from the pocket; and d) at least one wire routing member disposed on the garment and having a first aperture and a second aperture capable of receiving a wire extending from the at least one pocket through one of the first aperture or a second aperture, enclosing the wire within the wire routing member between the first aperture and the second aperture, and allowing the wire to exit the wire routing member through the other of the first aperture or the second aperture, wherein the at least one wire routing member is formed at least partially of an open center of the garment defined between the inner shell and the outer shell;

wherein the at least one pocket is an inner pocket disposed on an exterior surface of the inner shell;

further comprising an outer pocket disposed on the outer shell, the outer pocket in communication with the at least one wire routing member and the inner pocket;

*further comprising a wire holder member disposed on the inner shell adjacent one of the first aperture or the second aperture.*

* * * * *